United States Patent [19]

Harding, Jr.

[11] Patent Number: 5,566,256
[45] Date of Patent: * Oct. 15, 1996

[54] MINIATURE MICR DOCUMENT READER WITH POWER MANAGEMENT AND MOTORIZED CONVEYANCE

[75] Inventor: Richard W. Harding, Jr., Atlanta, Ga.

[73] Assignee: Checkmate Electronics, Inc., Roswell, Ga.

[*] Notice: The term of this patent shall not extend beyond the expiration date of Pat. No. 5,488,676.

[21] Appl. No.: 534,205

[22] Filed: Sep. 26, 1995

Related U.S. Application Data

[62] Division of Ser. No. 298,179, Aug. 30, 1994, Pat. No. 5,488,676, which is a continuation of Ser. No. 819,498, Jan. 10, 1992, abandoned.

[51] Int. Cl.⁶ .................................................. G06K 9/20
[52] U.S. Cl. ........................... 382/320; 382/139; 307/66; 235/449
[58] Field of Search .................................. 382/100, 325, 382/312, 313, 320, 321, 137, 139, 140; 235/449, 481, 492, 472; 307/46, 64, 66

[56] References Cited

U.S. PATENT DOCUMENTS

| Re. 29,994 | 5/1979 | Bossi | 191/2 |
|---|---|---|---|
| 3,313,923 | 4/1967 | Felchek | 235/92 |
| 3,319,074 | 5/1967 | Koch | 307/66 |
| 3,955,657 | 5/1976 | Bossi | 191/2 |
| 4,206,367 | 6/1980 | Petruska | 307/2 |
| 4,255,697 | 3/1981 | Buhler, III | 320/6 |
| 4,287,465 | 9/1981 | Godard et al. | 307/46 |
| 4,395,639 | 7/1983 | Bring | 307/66 |
| 4,396,902 | 8/1983 | Warthan et al. | 382/64 |
| 4,560,915 | 12/1985 | Soultanian | 320/35 |
| 4,737,702 | 4/1988 | Koenck | 320/40 |
| 4,742,289 | 5/1988 | Wahlstrom | 320/14 |
| 4,749,087 | 6/1988 | Buttifant | 382/7 |
| 4,821,332 | 4/1989 | Durham | 382/7 |
| 4,857,756 | 8/1989 | Haneda | 307/64 |
| 4,882,717 | 11/1989 | Hayakawa | 368/64 |
| 4,885,521 | 12/1989 | Crampton | 320/14 |
| 4,914,279 | 4/1990 | Massey | 235/449 |
| 5,047,988 | 9/1991 | Mizula | 235/492 |
| 5,054,092 | 10/1991 | LaCaze | 382/11 |
| 5,135,095 | 8/1992 | Kocznar et al. | 235/380 |
| 5,151,581 | 9/1992 | Krichever et al. | 235/467 |
| 5,189,291 | 2/1993 | Siemiatkowski | 235/472 |
| 5,258,606 | 11/1993 | Chadima, Jr. et al. | 235/472 |
| 5,309,031 | 5/1994 | Stewart et al. | 307/66 |

*Primary Examiner*—Leo Boudreau
*Assistant Examiner*—David R. Anderson
*Attorney, Agent, or Firm*—Nixon & Vanderhye P.C.

[57] ABSTRACT

A magnetic ink character recognition (MICR) system includes power management features so as to permit the unit to be powered by the auxilliary power provided by a generic host (e.g., an electronic cash register). The system also includes motorized conveyance features in combination with a track facilitating manual conveyance.

13 Claims, 5 Drawing Sheets

MINIATURE MICR DOCUMENT READER WITH POWER MANAGEMENT AND MOTORIZED CONVEYANCE

This application is a divisional of Ser. No. 08/298,179 filed on Aug. 30, 1994 (now U.S. Pat. No. 5,488,676, which in turn is a continuation of Ser. No. 07/819,498 filed on Jan. 10, 1992 (now abandoned).

This invention relates to magnetic ink character recognition, and more particularly to an inexpensive MICR document reader that can be used at the point of sale. Still more particularly, the present invention relates to a point-of-sale MICR document reader having power management and motorized conveyance.

Inexpensive MICR document readers are generally known. See assignee's U.S. Pat. No. 5,054,092, the entire disclosure of which is incorporated by reference herein as if expressly set forth.

Many electronic cash register ("ECR") systems use instruments to add functionality that are external to the ECR, such as check readers, bar code readers, or credit card readers. For example, MICR document readers may be installed at the point of sale (e.g., along side or as part of a conventional ECR). It is desirable for the document reader to directly provide recognized magnetic character information (e.g., the sequence of numbers appearing at the bottom of a customer's check) in digital form to the ECR so as to eliminate the need for the ECR operator to manually key the information.

For example, it is possible (in one exemplary configuration) to electrically connect the document reader as a so-called "wedge" (as shown in FIG. 1) between the keyboard of the ECR and the ECR processor. In this configuration, the document reader when inactive is transparent with respect to (and simply passes) data from the keyboard to the processor. However, when the document reader is active and has recognized a sequence of characters, it passes the recognized information in digital form (i.e., in the same form as numerical information is provided by the keyboard) to the ECR processor. This eliminates the need for the ECR operator to manually key in the recognized MICR information, and also provides compatibility with a wide range of different types of ECRs.

Usually, add-on equipment to an ECR system (e.g., external MICR document readers) requires external power because the ECR cannot provide sufficient power to operate the added instrument. External power supplies add cost and installation difficulty when anyone uses such added equipment. Similar problems may be encountered with any generic host system with add on equipment.

Conventional ECRs typically provide to their keyboard (or at some other access point) a DC power supply voltage (e.g., +5 VDC or +12 VDC) at a few hundred milliamperes. It is possible to design the add-on equipment to run at a power consumption below what is available from the host. This allows the added instrument to draw its power from the host and not require an external power supply. For example, the assignee (Checkmate Electronics) has successfully used this technique in its SMR300 series of manually conveyed (non-motorized) MICR check readers. However, as power requirements of the equipment increase (e.g., due to the presence of a motor to convey the document) or the power provided by the ECR decreases (some ECRs provide only 50 ma for example), this solution fails.

Another problem with conventional MICR document readers relates to conveyance techniques. As explained in U.S. Pat. No. 5,054,092, there are many advantages to a manual (non-motorized) conveyance system. However, some users may desire automatic (motorized) conveyance in the context of an inexpensive point-of-sale MICR reader. It would be desirable to give the purchaser a choice between manual and automatic conveyance.

The present invention solves these problems by providing an inexpensive compact MICR document reader with power management and an automatic conveyance option.

In regard to power management, the MICR reader provided by the present invention has power requirements when fully operating that exceed the amount of current continuously available from a typical ECR. For example, the reader may include a processor and related components, a magnetic read head, an encoder wheel and associated A/D converter and other timing circuitry, and a motor and associated driving circuitry. When all of these components are operating, they may draw in excess of the 200 milliamperes or so available from a typical ECR.

However, the usage duty cycle of the MICR reader is low (since the unit is only operated infrequently such as at the end of a transaction when the customer presents a check for payment). In accordance with one feature provided by the present invention, the unit goes into a low power mode when dormant and not in use. During this dormant period, the reader stores energy obtained from the ECR. When the unit begins operating in the active mode (e.g., upon insertion of a document into the reader for recognition), it obtains power from its stored reserves (in addition to the power continuously applied by the ECR). In this way, the reader's peak power requirements may exceed the amount of power the ECR is capable of continuously supplying.

The preferred embodiment MICR reader may include a motor and associated gear arrangement so as to permit automatic document conveyance. The document is conveyed within a track of the type described in U.S. Pat. No. 5,054,092. Thus, either manual or automatic document conveyance is possible.

These and other features and advantages of the present invention may be better and more completely understood by referring to the following detailed description in conjunction with the drawings, of which:

Figure 1:
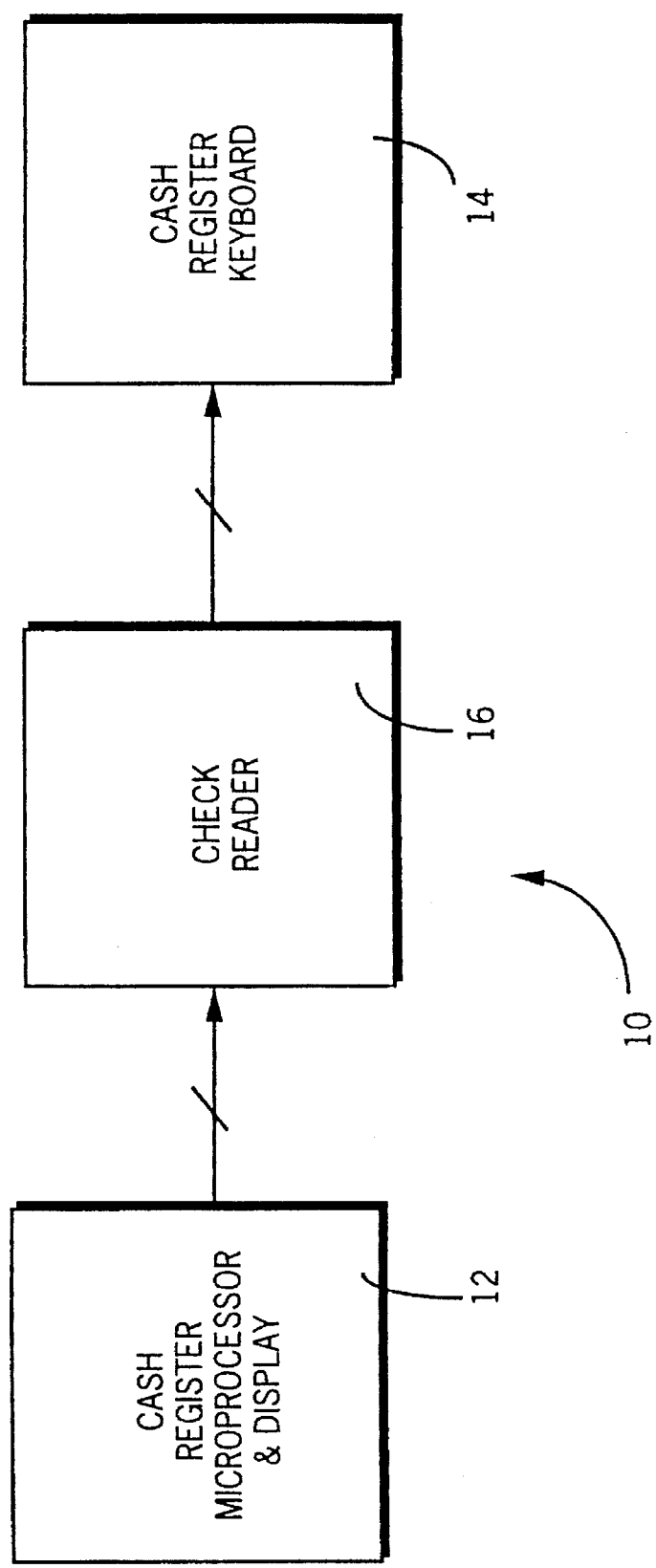
FIG. 1 is a high-level block diagram of an exemplary electronic cash register system with the MICR reader provided by the present invention connected as a "wedge" between the ECR electronics and the ECR keyboard.
Figure 3:
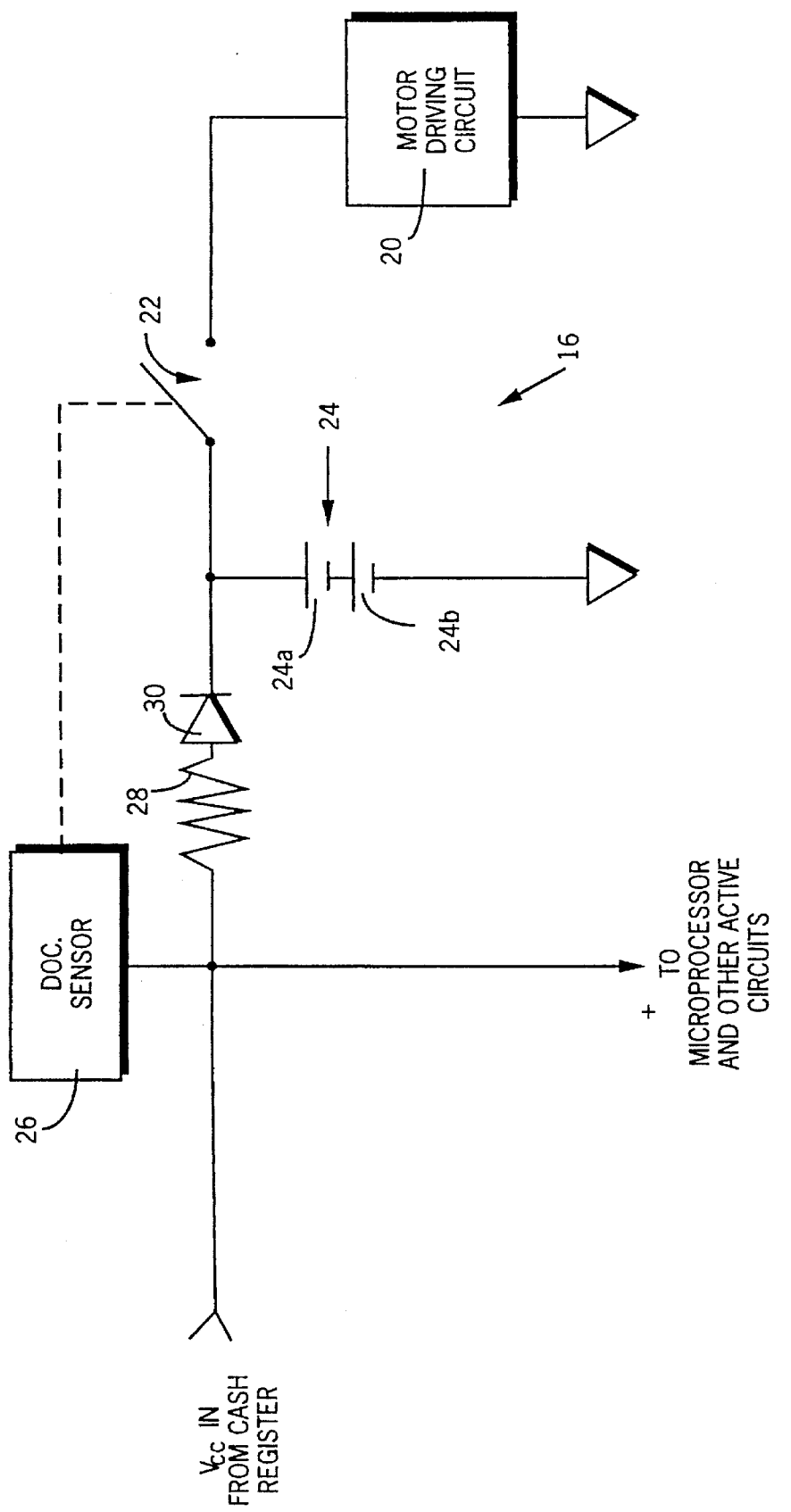
Figure 4:
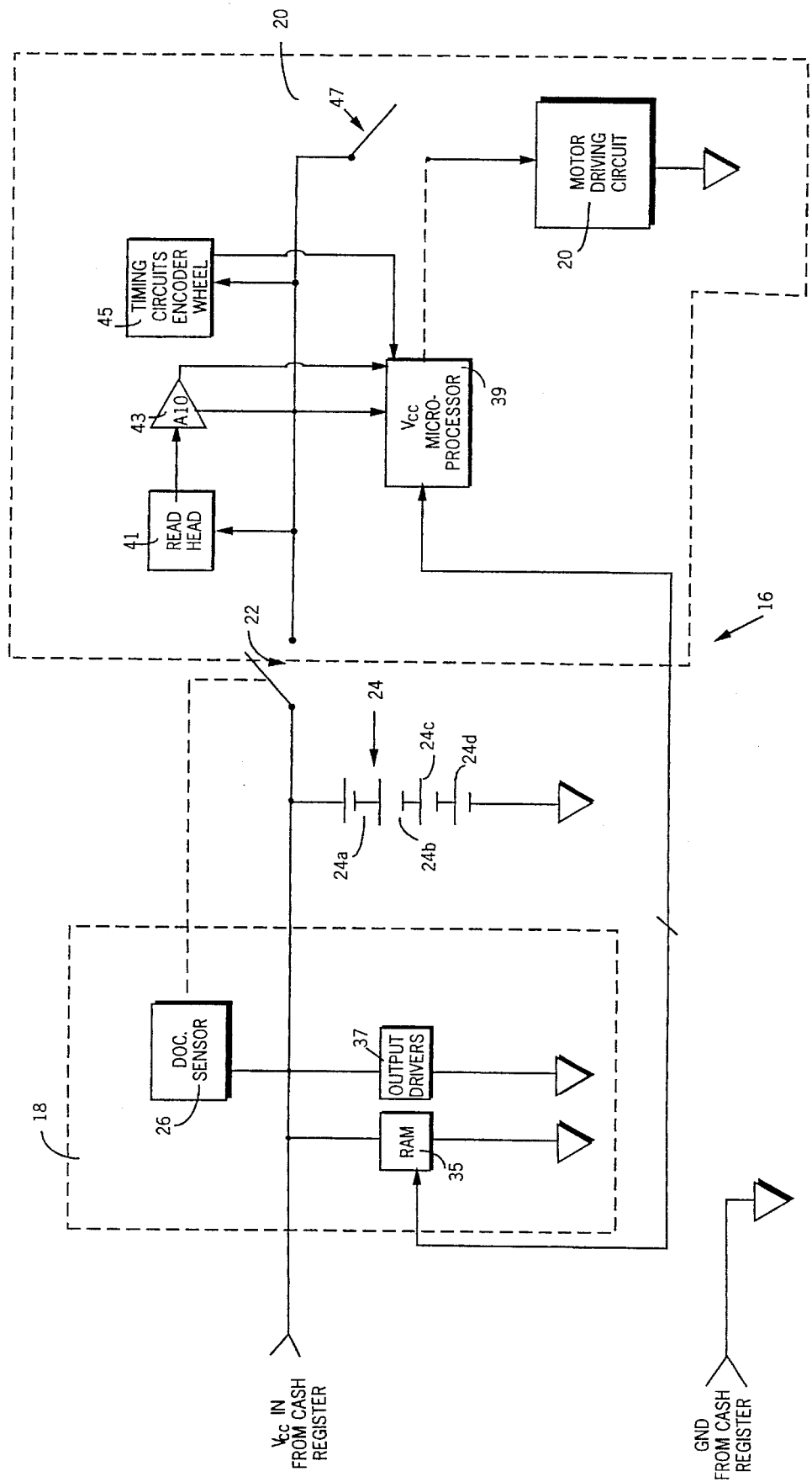
Figure 5:
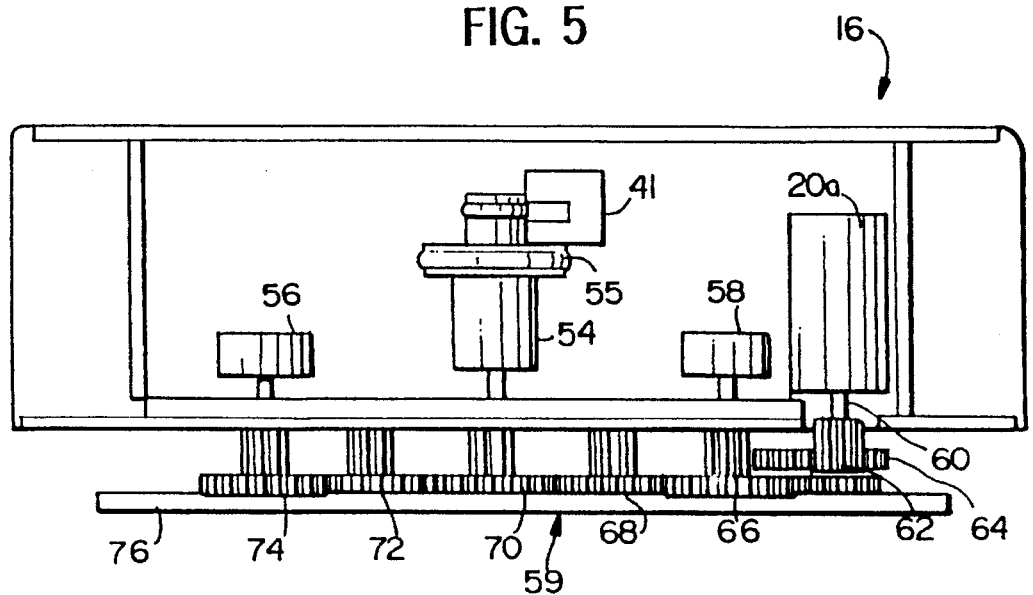
Figure 6:
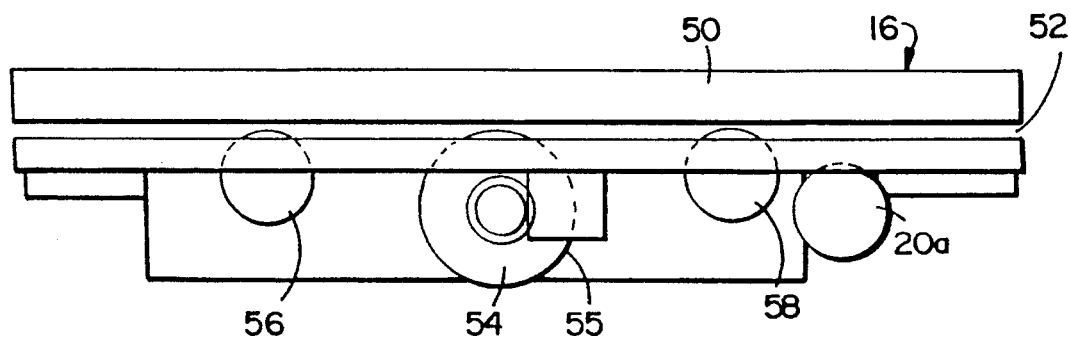

FIGS. 3 and 4 are schematic circuit diagrams of two different exemplary power management configurations; and FIGS. 5 and 6 are perspective views of an exemplary motor-controlled automatic document conveyance arrangement provided within the FIG. 1 MICR reader FIG. 1 shows an electronic cash register system (ECR) 10 including a cash register processor and associated display unit ("processor unit") 12, and further including a cash register keyboard 14. The MICR reader ("reader") 16 provided by the present invention may be, for example, connected as a "wedge" between the processor unit 12 and the keyboard 14. Reader 16 intercepts power provided by processor unit 12 (which includes a DC power supply) to keyboard 14, and uses this power as its own power source such that no additional or auxiliary power source is required. Reader 16 need not be connected as a "wedge", of course, and maybe instead connected in parallel with keyboard 14 or otherwise connected to processor unit 12 in a conventional manner.

Figure 2:
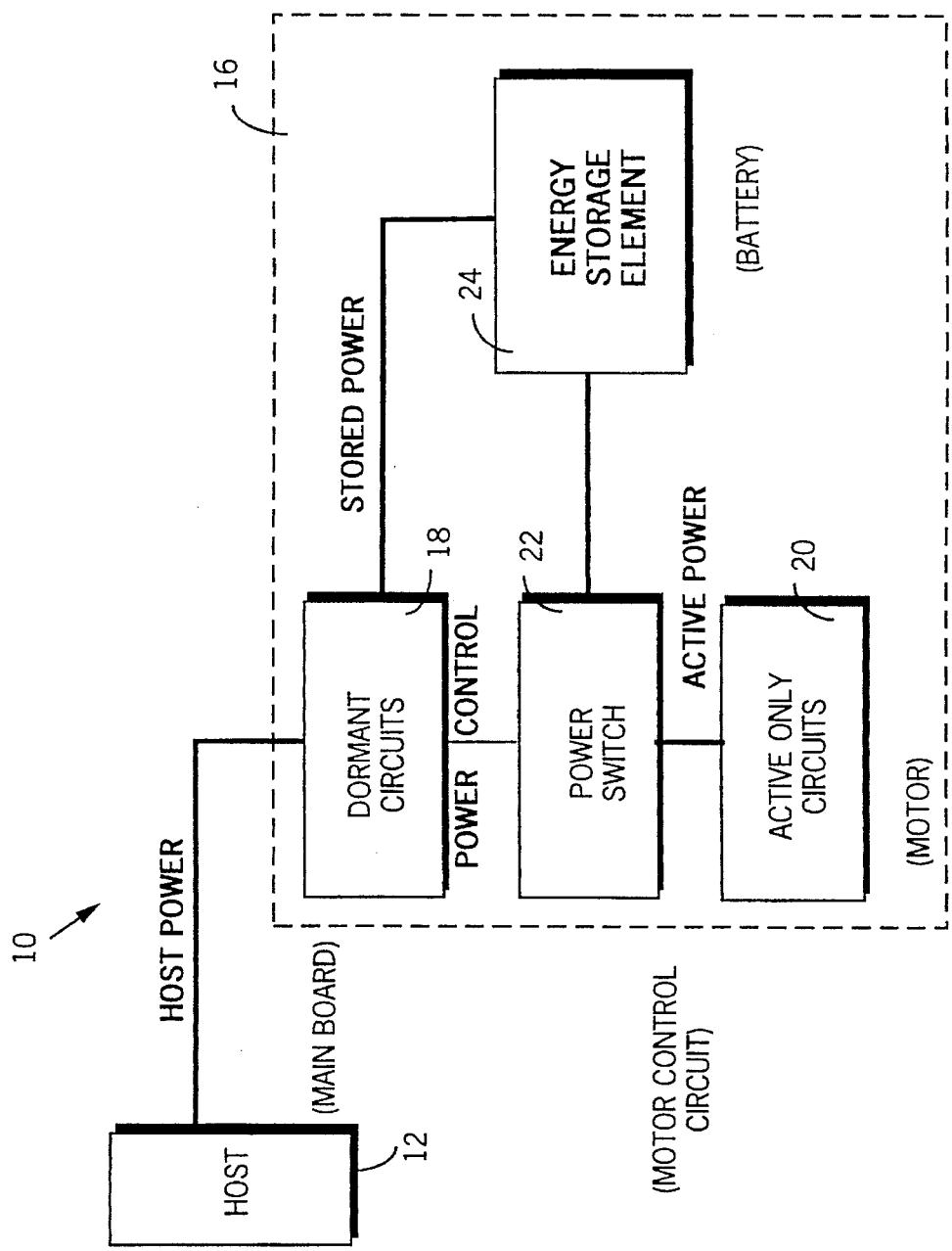
FIG. 2 is a block schematic diagram of an exemplary power management system provided by the FIG. 1 MICR reader.

In the preferred embodiment, reader 16 has an active mode (i.e., when the reader is reading a check) and a dormant mode (when no check is being read). Referring to FIG. 2, reader 16 includes dormant circuits 18, active only circuits 20, a power switch 22, and an energy storage element 24. The dormant circuits 18 remain powered on at all times, and thus continually draw power (such dormant circuits typically include at least a document sensor to sense the presence of a document to be read; a memory storing data; and output latches that interface with ECR processor unit 12). Active only circuits 20 comprise circuits that are active only during the active mode of reader 16 (e.g., a motor and associated motor driving circuit). Energy storage element 24 (which may comprise a rechargeable battery or a capacitor, for example) is connected to the power continually supplied by processor unit 12 so that the energy storage element is trickle charged by the processor unit power. Power switch 22 connects energy storage element 24 to active only circuits 20 when reader begins operating in the active mode (e.g., in response to sensing of a document by a document sensor). Thus, for example, when a check is placed into reader 16, the document sensor turns on power switch 22, which then turns on the motor (the main component of the active only circuits 20). Energy storage element 24 provides all of the power for the motor in the preferred embodiment.

Processor unit 12 is capable of continuously supplying approximately 200 ma at 5 VDC, for example, and preferred embodiment reader 16 has dormant power requirements of about 190 milliamperes at 5 VDC. During the active mode, reader 16 requires about 400 milliamperes at 5 VDC. Thus, for every second of active time, reader 16 needs about 40 seconds of dormant time to recapture the energy consumed, because the dormant power is split to have 10 ma put into storage, and 180 ma used by the dormant circuits in the preferred embodiment. Thus, reader 16 has an average 40:1 duty cycle. The peak duty cycle allowed and duration of peak duty cycle depends on the amount of energy storage available.

FIG. 3 is a detailed schematic diagram of pertinent portions of one exemplary embodiment of reader 16. In the exemplary FIG. 3 arrangement, energy storage element 24 compares a pair of series connected AAA or AA nicad batteries 24a, 24b of conventional design. These batteries 24a, 24b are trickle charged by power supplied by processor unit 12 via a trickle charge circuit comprising, in the preferred embodiment, a resistor 28 connected in series with a diode 30. Resistor 28 provides a current limiting function. Diode 30 prevents batteries 24a, 24b from discharging through processor unit 12.

Batteries 24a, 24b are directly connected (through power switch 22) to motor driving circuit 20 such that the motor is powered by the energy stored in the batteries. Power switch is closed by a signal generated by document sensor 26 (which senses the presence of a document within the read track). The reader 16 processor, read head, timing encoder, and associated electronics are all directly connected to and continuously powered by the power from processor unit 12 in this exemplary embodiment (the structure and operation of such components are all conventional as disclosed in U.S. Pat. No. 5,054,092).

FIG. 4 is a schematic diagram of a further embodiment of reader 16 having further decreased or minimized dormant power requirements. In this exemplary configuration, the dormant circuits 18 comprise document sensor 26, a volatile random access memory 35, and output drivers 37. These may be the only components within reader 16 that receive power continually. Paper sensor 26 is continually powered in order that it may detect the presence of a document to be read (and thereby control reader 16 to switch from the dormant mode into the active mode). RAM 35= is continually powered so that active configuration data is not lost. Output drivers 37 (used to send data to ECR processor unit 12) are continually powered to prevent them from entering undefined states and thereby provide unknown outputs to the processor unit.

In this FIG. 4 embodiment, active only circuits 20 comprise motor driving circuits (and associated motor) 20, and further include the reader microprocessor 39, reader magnetic read head 41 and associated A/D converter 43, and timing circuits (including encoder wheel) 45 (these components are conventional and may be as described in U.S. Pat. No. 5,054,092). When document sensor 26 senses the presence of a document in reader 16, it closes power switch 22 to provide power to main processor 39. Main processor 39 then executes a conventional power up reset software routine, part of which controls an additional power switch 47 to close (thereby providing power to motor driving circuits 20). Energy storage element 24 may comprises plural individual battery cells 24a–24d connected in series and/or parallel to provide additional energy storage. Thus, document sensor 26 activates microprocessor 39, which in turn controls (activates and deactivates) motor driving circuits 20.

Since the main processor 39 and associated components are active only circuits in the FIG. 4 embodiment, the dormant current drawn by reader 16 is decreased relative to the FIG. 3 embodiment. This leaves more power for charging batteries 24a, 24b and/or permits the system to draw less dormant current (e.g., in the case of ECRs providing less than 200 ma of current continually).

FIGS. 5 and 6 are side and top views, respectively, of relevant mechanical features of reader 16. Referring to FIG. 6, reader 16 includes a housing 50 defining a document track or slotted path 52 therein of the type and construction as described in U.S. Pat. No. 5,054,092. This slotted path 52 permits a document (e.g., a bank check) to be easily manually conveyed therethrough while preventing the document from collapsing during such conveyance. Path 52 thus has the effect of "rigidifying" the document as it is manually conveyed therethough, and is of a height and dimensions such that an upper edge of the document protrudes from the slot so as to be grasped (e.g., between the thumb and one or more fingers of the human hand) and moved by hand during manual conveyance.

Reader 16 further includes an encoder or timing wheel 54, and may further include drive wheels 56, 58. Encoder wheel 54 is as described in U.S. Pat. No. 5,054,092, and includes an outer rubberized circumferential surface 55 that protrudes into slotted path 52 through a gap (not shown) in the wall defining the slotted path. Surface 55 frictionally engages a document disposed within slotted path 52 such that encoder wheel 54 rotates as the document moves linearly along the slotted path.

Similarly, drive wheels 56, 58 are rubberized and protrude into slotted path 52 through gaps in the wall defining the slotted path. Drive wheels 56, 58 frictionally engage the surface of a document within the slotted path 52, so that rotation of the drive wheels causes the document to be linearly conveyed along the length of the slotted path. Thus, a document can be manually conveyed along slotted path 52 by force imparted by a human hand; or rotation of drive wheels 56, 58 may be used to automatically convey the document along the path.

Drive wheels 56, 58 are driven to rotate by the drive shaft 60 of electric motor 20a. FIG. 5 shows an exemplary gearing arrangement 59 for coupling rotation of drive shaft 60 to rotate drive wheels 56, 58. In the preferred embodiment, arrangement 59 including motor 20a, drive wheels 56, 58, and gears 62–74 may preferably be part of a unitary assembly (e.g., mounted on a common subhousing 76) such that the assembly can be optionally easily installed into reader 16 at the time of manufacture (i.e., to convert the reader from manual-conveyance-only to a reader having automatic conveyance capabilities).

In the exemplary arrangement shown, a first gear 62 fixedly disposed to drive shaft 60 is coupled to a reduction gear 64. Reduction gear 64, in turn, is coupled to a drive gear 66 sharing a common shaft with drive wheel 58. Transmission gears 68, 70, 72 couple rotation from drive gear 66 to a further drive gear 74, the further drive gear 74 sharing a common shaft with drive wheel 56. Since there is no reduction in gearing in the coupling between drive gear 58 and further drive gear 74, drive wheels 58, 56 rotate at the same speed so as to convey a common document along the length of slotted path 52 in response to rotation of motor drive shaft 60.

While the invention has been described in connection with that is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A device for use in combination with an electronic cash register (ECR) of the type which supplies DC electrical power to at least one other component at a rated amount to supply all of the DC electrical power required of said at least one other component, said device comprising:

(i) a circuit having active and inactive modes, and which demands a peak supply of DC electrical power in excess of that supplied by said ECR host to said at least one other component when in said active mode thereof;

(ii) a power management system for storing DC electrical power during said inactive mode of said circuit and supplying said stored DC electrical power during said active mode of said circuit so as to satisfy said peak supply of DC electrical power demanded by said circuit; and (iii) a connector for intercepting said rated amount of DC electrical power supplied by said ECR to said at least one other component and supplying said intercepted DC power to said power management system.

2. A device as in claim 1 in the form of a document reader, wherein said circuit includes a motor for conveying a document.

3. The combination comprising:

a data entry keyboard operable on DC electrical power;

an electronic cash register (ECR) having at least one preexisting source of DC electrical power which is supplied to said keyboard;

a component having a peak demand of DC electrical power in excess of that supplied by said preexisting source; and a power management system electrically interconnected to at least one of said preexisting source and said keyboard so as to intercept power supplied to said keyboard and store said intercepted DC electrical power as an available stand-by power source, said power management system supplying said stored DC electrical power from said available stand-by power source to said component in response to said peak demand.

4. A method of operating a point of sale reader having a low current draw mode and a high current draw mode, said method comprising:

(a) connecting the power input of said point of sale reader between an electronic cash register and an electronic cash register peripheral device;

(b) intercepting, with said reader, at least part of the DC current delivered by said electronic cash register to power said electronic cash register peripheral device;

(c) in said low current draw mode of said reader, powering said reader with a first part of said intercepted DC current and storing a second part of said intercepted current; and (d) in said high current draw mode of said reader, powering at least one component within said reader at least in part with said current stored during said step (c).

5. A method as in claim 4, wherein said connecting step (a) includes connecting a wedge between said electronic cash register and the keyboard of said electronic cash register.

6. A method as in claim 4, wherein said intercepting step (b) comprises intercepting less peak current than is required to power said reader in said high current draw mode.

7. A method as in claim 4, wherein said step (d) comprises powering a transport motor with said current stored during said step (c).

8. A method as in claim 4, further including reading a document with said reader in said high current draw mode.

9. A method as in claim 4, wherein said step (c) includes using, with said reader, on the order of half the DC current said reader uses in said step (d).

10. A method as in claim 4, further including repeating said step (c) for at least a predetermined time period before repeating said step (d).

11. A method as in claim 4, wherein said step (d) includes powering a document sensor within said reader.

12. A method as in claim 4, wherein said step (d) includes powering a memory device within said reader.

13. A method as in claim 4, wherein said step (d) includes powering data output circuits within said reader that interface with said electronic cash register.

* * * * *